July 13, 1926.
L. P. KELLY
BIRD FEEDER
Original Filed Jan. 26, 1924
1,592,493
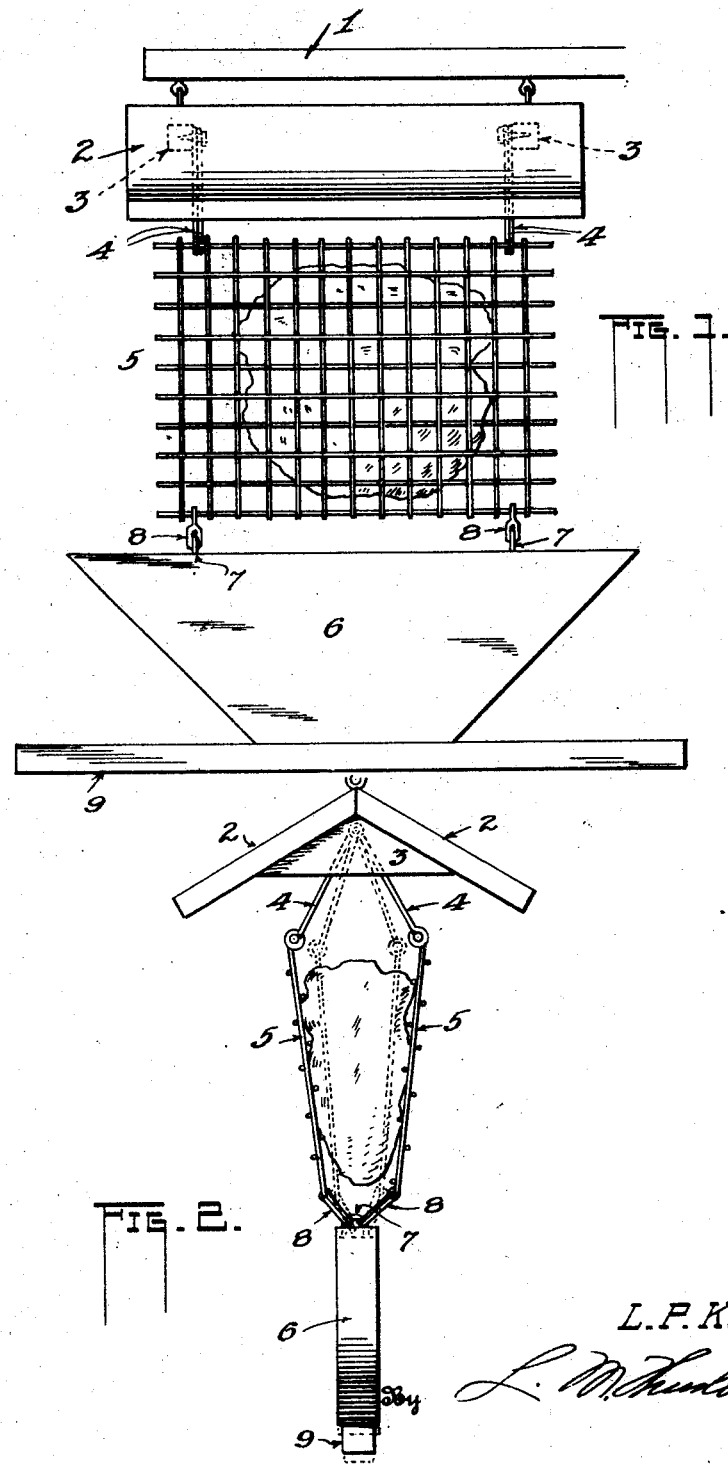

Patented July 13, 1926.

1,592,493

UNITED STATES PATENT OFFICE.

LEWIS P. KELLY, OF PEORIA, ILLINOIS.

BIRD FEEDER.

Original application filed January 26, 1924, Serial No. 683,859. Divided and this application filed March 27, 1925. Serial No. 18,747.

This invention pertains to bird feeders, having to do more particularly with a feeder designed to hold fat or suet and which will automatically contract upon that material as the bulk there thereof is reduced.

An object of my invention is that of providing a form of feeder consisting of two sections of wire screen, for example, adapted to clamp between them the feeding material, and so mounted that as the material is consumed the sections will contract upon it to the end that birds feeding at the device can always reach and obtain the material.

Another object is the provision of two sections of wire screen or equivalent means hingedly related and so mounted that birds may feed from both sides of a feeding material held between them and to employ means, such as a weight suspended from the sections, for example, to cause them to approach one another as the material is reduced in bulk.

In addition to these objects the invention relates to certain structural details to be pointed out herein and form the subject of certain of the appended claims.

This application is divided from my pending application Serial Number 688,859, filed January 26, 1924.

In the appended drawing forming part hereof,

Figure 1 is a side elevation of the feeding device of my invention, and

Figure 2 is an end elevation of the same.

The numeral 1 indicates any suitable support such as a bracket, the eave of a building, tree limb, or the like, and suspended in any desired manner therefrom is a watershed which I preferably use, and in this instance consists of two abutting opposite sloping members 2 having bracing parts 3 therebeneath.

Pivotally suspended from each of the latter are two links 4, the links of each pair adapted to swing independently in the direction of one another as indicated in Figure 2. A section of wire netting 5 is suspended from corresponding links of each pair and these face one another as shown in Figure 2. At 6 is a member of wood, for instance, serving as a weight for a purpose to be described, said member having in one edge a pair of spaced staples 7, for example, each of which has loosely held therein a pair of links 8, the latter, in turn, being loosely engaged with the lower edges of the sections 5. Serving as a convenient perch for the birds is a strip 9 secured to the lower edge of said member 6 and extending for some distance at each end therefrom.

It is to be noted that the links 4, the sections 5 and the links 8 are all free to move with respect to one another and that, therefore, the said sections 5 can readily and freely move in the direction of one another and that this may result the links 4 which suspend the sections will swing about the points from which they are hung upon the members 3. Likewise, the links 8 may spread apart or approach one another as the sections take up the movement described.

Naturally, when there is no feeding material between the sections 5 the latter will lie upon one another, being drawn to that position by their weight or by the added weight of the member 6.

In introducing the feeding material between the sections they are spread apart to some such position as shown in the continuous lines in said Figure 2. Now, as the material is consumed a downward pull being constantly exerted on the sections they will approach one another thus following the receding surfaces of the material from which the birds feed. In this manner the material is always within reach. That is to say, the netting, since following the constantly changing thickness of the material, the latter does not get beyond reach of the birds no matter how short-billed they may be.

An advantage of this form of feeder is that it may be fed from at either side thus giving double feeding capacity and accommodation for a number of birds at the same time. Further, when suspended in the open it presents a very ornamental appearance in that it is balanced, both sides being identical in form.

It is to be understood that if the sections 5 are sufficiently heavy in themselves they will follow in toward one another as the material is consumed without the especial need of the weight-member 6, the lower edges of said sections being limited in spreading movement through some such means as shown so that the material cannot slip out.

Having described my invention, I claim;—

1. A bird feeder including with a support, a pair of members pivotally suspended at one end from the support at substantially a common point, a pair of sections of foraminous material facing one another and each hingedly suspended at one edge from the other ends of the members, and a link hingedly attached at one end to the opposite edge of each section, the said members and said links adapted to permit the sections to swing in the direction of one another, said links being hingedly held at their other ends to limit the spreading of said sections.

2. A bird feeder including with a support, a pair of members pivotally suspended at one end from the support at substantially a common point, a pair of sections of foraminous material facing one another and separately hingedly suspended at one edge to the other end of the said members, and a pair of links each hingedly suspended from the suspended edge of one of the sections and held at their other ends in a hinged manner at substantially a common point.

3. A bird feeder including with a support, a pair of members pivotally suspended at one end from the support at substantially a common point, a pair of sections of a foraminous material facing one another and separately hingedly suspended at one edge to the other ends of the said members, a pair of links each hingedly suspended from the suspended edge of one of the sections, and a weight to which the opposite ends of the links are hingedly attached.

4. A bird feeder including a pair of independent pivotally suspended links, a section of wire screen pivotally hung at its upper edge from each link, the sections facing one another between which to hold a feeding material, and means connected to and for permitting the lower edges of the sections to freely move but limiting the spreading action thereof, the whole adapted by its weight to clamp the said material between the said sections and close upon the same as its bulk is reduced.

5. A bird feeder including a pair of independent links pivotally suspended from substantially the same point, a section of wire screen freely suspended at its upper edge from each link facing one another between which to hold a feeding material, said sections adapted to swing relatively to a position substantially parallel to one another, a weight beneath the sections, and a link hingedly attached to each section and separately hingedly attached to the weight.

6. A bird feeder comprising a pair of wire screen sections, means to suspend said sections at their upper edges, said means permitting said sections to move relatively to a position substantially parallel to one another and adapted to rise and fall in such movement, a weight beneath the sections, and a link hingedly attached to each section and separately hingedly attached to said weight.

7. A bird feeder comprising two pair of links pivotally suspended at one end and independently of one another from a common point, the links of a pair being free to swing relatively, a screen section hingedly suspended at its upper edge from each pair, said sections facing one another and adapted to hold a feeding material between them, a weight beneath the sections, links hingedly connecting the lower edges of the sections with said weight permitting the said sections to move relatively at said edges, and a perch extending from said weight.

8. A bird feeder comprising a shelter portion, pairs of links pivotally suspended from and beneath the same, the links of a pair being free to swing relatively, a swing section hingedly suspended at its upper edge from each of said pairs of links, said sections facing one another and adapted to hold a feeding material between them, a weight beneath the sections, links hingedly connecting the lower edges of the sections with said weight permitting the said sections to move relatively at said edges, and a perch extending from said weight.

In testimony whereof I affix my signature.

LEWIS P. KELLY.